United States Patent [19]
Fraidlin et al.

[11] Patent Number: 5,822,198
[45] Date of Patent: *Oct. 13, 1998

[54] SINGLE STAGE POWER CONVERTER AND METHOD OF OPERATION THEREOF

[75] Inventors: Simon Fraidlin, Plano, Tex.; Valery I. Meleshin, Moscow, Russian Federation; Rais K. Miftakhutdinov, Moscow, Russian Federation; Alexey V. Nemchinov, Moscow, Russian Federation

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 668,221

[22] Filed: Jun. 21, 1996

[51] Int. Cl.$^6$ .................................................. H02M 3/335
[52] U.S. Cl. .............................................. 363/17; 363/98
[58] Field of Search ................................ 363/17, 16, 37, 363/89, 98, 131, 132

[56] References Cited

U.S. PATENT DOCUMENTS

| | | | |
|---|---|---|---|
| 4,768,141 | 8/1988 | Hubertus et al. | 363/16 |
| 5,081,570 | 1/1992 | Chibani et al. | 363/17 |
| 5,159,541 | 10/1992 | Jain | 363/26 |
| 5,245,520 | 9/1993 | Imbertson | 363/17 |
| 5,268,830 | 12/1993 | Loftus, Jr. | 363/17 |
| 5,274,543 | 12/1993 | Loftus, Jr. | 363/127 |
| 5,305,191 | 4/1994 | Loftus, Jr. | 363/17 |
| 5,321,235 | 6/1994 | Makino et al. | 219/10.55 B |
| 5,382,882 | 1/1995 | Nerone | 315/307 |
| 5,406,051 | 4/1995 | Lai | 363/17 X |
| 5,408,403 | 4/1995 | Nerone et al. | 363/37 |
| 5,438,498 | 8/1995 | Ingemi | 363/17 |
| 5,642,267 | 6/1997 | Brkovic et al. | 363/16 |
| 5,719,754 | 2/1998 | Fraidlin et al. | 363/17 |

OTHER PUBLICATIONS

"Integrated High Quality Rectifier–Regulators" by Michael Madigan, Robert Erickson and Esam Ismail; Department of Electrical and Computer Engineering; University of Colorado, 1992 pp. 1043–1051.

"Design of a Simple High–Power–Factor Rectifier Based on the Flyback Converter" by Robert Erickson and Michael Madigan; Department of Electrical and Computer Engineering; University of Colorado; 1990 pp. 792–821.

"Reduction of Voltage Stress in Integrated High–Quality Rectifier–Regulators by Variable–Frequency Control" by Milan M. Jovonovic of DELTA Power Electronics Lab., Inc. of Blacksburg, VA and Dan M.C. Tsang and Fred C. Lee of Virginia Power Electronics Center Department of Electrical Engineering, Blacksburg, VA: 1994 pp. 569–575.

"A New Family of Single–Stage Isolated Power–Factor Correctors with Fast Regulation of the Output Voltage" by Richard Redl of ELFI S.A., Switzerland and Laszlo Balogh of Ascom Energy Systems, Switzerland and Nathan O. Sokai of Design Automation, Inc., U.S.A.; 1994 pp. 1137–1144.

"A Novel Single–Phase Power Factor Correction Scheme" by Yimin Jiang, Fred C. Lee, Guichao Hua Wei Tang, Virginia Power Electronics Center, The Bradley Department of Electrical Engineering, Virginia Polytechnic Institute and State University, Blacksburg, VA; 1993 pp. 287–292.

(List continued on next page.)

Primary Examiner—Adolf Berhane

[57] ABSTRACT

A single stage power converter has an energy storage device and is configured to receive electrical power. The single stage power converter includes: (1) an inductor, coupled to the energy storage device, for affecting a voltage across the energy storage device, (2) an asymmetrical half-bridge power circuit coupled to the energy storage device and having first and second power switches capable of being alternately activated to conduct current from the energy storage device to an output thereof and (3) a controller for controlling activation of the first and second power switches as a function of a characteristic of the output thereby to enhance a regulation of the output.

21 Claims, 4 Drawing Sheets

OTHER PUBLICATIONS

"Design Considerations for Single–Stage Isolated Power–Factor–Corrected Power Supplies with Fast Regulation of the Output Voltage" by Richard Redl of ELFI S.A., Switzerland and Laszlo Balogh of Unitrode Integrated Circuits, Merrimack, N.H. U.S.A.; 1995 pp. 454–458.

"Novel Single Stage AC–to–DC Converters with Magnetic Amplifiers and High Power Factor" by Milivoje Brkovic, TESLACo, Irvine, CA and Slobodan Cuk, Power Electronics Group, Pasadena, CA; 1995 pp. 447–453.

"RMS, DC, Peak, and Harmonic Currents in High–Frequency Power–Factor Correctors with Capacitive Energy Storage" by Richard Redl of ELFI S.A., Switerland and Laszlo Blogh of Ascom Hasler, Energy Systems, Switzerland 1992 pp. 533–540.

"Current Waveform Distortion in Power Factor Correction Circuits Employing Discontinuous–Mode Boost Converters" by Kwang–Hwa Liu and Yung–Lin Lin of ITT Power Systems Corp., Tucson, Arizona 1989 pp. 825–829.

"Sub–Kilowatt Telecom Rectifiers: Design Trade–Offs" by A.S. Kislovski of Ascom Energy Systems, Switzerland 1994 pp. 241–248.

"Input Current Shaper Using CUK Converter" by Milivoje Brkovic and Slobodan Cuk of Power Electronics Group, California Institute of Technology, Pasadena, California; 1992 pp. 532–539.

"A Switching Power Supply of 99% Power Factor by the Dither Rectifier" by T. Takahashi and R.Y. Igarashi of Nagaoka University of Technology, Niigata, Japan 1991 pp. 714–719.

ND METHOD OF OPERATION THEREOF

SINGLE STAGE POWER CONVERTER AND METHOD OF OPERATION THEREOF

TECHNICAL FIELD OF THE INVENTION

The present invention is directed, in general, to power supplies and, more specifically, to a single stage power converter and a method of operation thereof.

BACKGROUND OF THE INVENTION

Developing highly-efficient power supplies, especially in combination with the ever-increasing constraints of high power density, is a continuing goal in power electronics. A switched-mode power converter or switched-mode converter is a frequently employed component of a power supply that converts an input voltage waveform into a specified output voltage waveform. There are several types of switched-mode converters including, for instance, an asymmetrical half-bridge power converter.

A conventional asymmetrical DC/DC half-bridge power converter ("half-bridge converter") includes two (2) power-switching transistors coupled to a control circuit, at least one input/output isolation transformed, a rectifier and a low-pass filter. The half-bridge converter generally operates as follows. The first and second power-switching transistors alternately conduct current in a complimentary manner to convert an input DC voltage into an AC voltage to be impressed across the isolation transformer. The rectifier, then, rectifies the voltage and the low-pass filter smooths and filters the rectified voltage for delivery to a load being supplied by the half-bridge converter.

The control circuit monitors the output voltage of the half-bridge converter and adjusts the duty cycle of the power-switching transistors to ultimately control the output voltage of the half-bridge converter. This degree of control provides a mechanism to maintain the output voltage at a relatively consistent level despite relative fluctuations in the input voltage and the load at the output.

In off-line power supply applications, a high power factor is frequently required. While a power factor of unity (i.e., 1.0) is the ultimate goal, a lesser power factor is in some cases considered acceptable in the related field. Therefore, in applications employing a DC/DC power converter or DC/DC converter (e.g., the half-bridge converter), a power factor correcting power converter on the front-end of the DC/DC converter may also be necessary to provide an acceptable power factor for the power supply.

A non-isolated boost power converter or boost converter, operating in a continuous conduction mode of operation or in a discontinuous conduction mode of operation with the appropriate control circuitry, may serve as the front-end power converter (i.e., front-end converter) to the half-bridge converter. A conventional boost converter includes an inductor and switching device coupled to an input voltage source of the boost converter. The switching device is then coupled to a diode and a capacitor. The load is connected in parallel to the capacitor. The control circuitry adjusts a duty cycle of the switching device to maintain the output voltage to the load within design parameters; the control circuity also controls the switching device and as a result achieves an instantaneous input current from an AC input in proportion to the instantaneous input voltage. The output voltage of the boost converter is always greater than the input voltage. When the switching device is on, the diode is reverse biased and the input voltage supplies energy to the inductor. When the switching device is off, the output stage receives energy from the inductor and the input voltage source. The boost power factor correcting converter, therefore, provides an acceptable power factor while providing a regulated voltage to the DC/DC converter coupled thereto.

While the front-end converters for power factor correction provide a viable solution in power supplies employing DC/DC converters (e.g., the half-bridge converter), the design may be improved for the following reasons. First, the power supply employs two separate power stages, with independent control, to satisfy power conversion to the load. As a result, the overall efficiency of the power supply is reduced because of the inherent inefficiencies associated with two separate and distinctly controlled converter stages in the power supply. Second, employing a boost converter, or other converter topologies, to serve as a power factor corrector adds additional complexity to the power supply. For instance, the boost converter includes a separate control circuit that takes up space and adds complexity to the front-end of the half-bridge converter. With the ever increasing goal of increasing the power density of the power supply, the separate front-end converter detracts from, rather than facilitates, the simplicity of the power supply.

Accordingly, what is needed in the art is an single stage power converter with power circuitry and controller that provides a well-regulated output with a sufficiently fast feedback loop for good transient response and, at the same time, provides a high power factor for a power supply employing the single stage power converter to advantage.

SUMMARY OF THE INVENTION

To address the above-discussed deficiencies of the prior art, the present invention provides a single stage power converter method of operation thereof.

The single stage power converter including an energy storage device and couplable to a source of electrical power (e.g., an AC source of electrical power), includes: (1) an inductor, coupled to the energy storage device, for affecting a voltage across the energy storage device, (2) an asymmetrical half-bridge power circuit coupled to the energy storage device and having first and second power switches capable of being alternately activated to conduct current from the energy storage device to an output thereof and (3) a controller for controlling activation of the first and second power switches as a function of a characteristic of the output thereby to enhance a regulation of the output.

The present invention provides the advantages of two-stage power converters into a single stage power converter or single stage converter. More specifically, the single stage converter provides power factor correction (e.g., approaching unity power factor) at the input, while at the same time, maintaining a suitable voltage across the energy storage device (coupled between the inductor and the asymmetrical half-bridge power circuit or half-bridge power circuit) and a well-regulated output to a load coupled to the single stage converter. The single stage converter performs the above-referenced functions with simplicity by employing a single controller and by eliminating additional power mesh components and control circuitry replete in the prior art. The single stage converter produces additional benefits, such as, fast transient response and low output ripple due to a wide frequency band supportable by the controller feedback loop.

For the purposes of the present invention, the following terms are broadly defined as follows. The inductor affects a voltage across the energy storage device. The term, affects, should be construed in its broadest sense to include even indirect results is therefrom. For instance, as described below, the operation of the inductor maintains an energy level of the energy storage device thereby varying the voltage, within a acceptable range, thereacross to enhance an overall performance of the single stage converter.

In a related embodiment of the present invention, the inductor is capable of storing energy from the source of electrical power during a first switching interval or first interval. The inductor is further capable of delivering energy to the energy storage device during a second switching interval or second interval. The inductor operates in a discontinuous conduction mode of operation to achieve power factor correction. In another related embodiment, the controller activates the first power switch during the first interval for a duty cycle (D) to provide a first conductive path between the source of electrical power and the inductor during the first interval. The controller further activates the second power switch during the second interval for a duty cycle (1-D) to provide a second conductive path between the inductor and the energy storage device during the second interval.

The controller, therefore, monitors the output of the half-bridge power circuit and activates the switches in a complementary manner to suitably regulate the output voltage. The first power switch operates to store energy in the inductor, while at the same time, delivering the previously stored energy from the energy storage device to the output of the single stage converter. In the alternate cycle, the second power switch conducts while the first power switch is not conducting. During this interval, the energy from the inductor is transferred to the energy storage device. Again, as a result of the above-described operation, the voltage across the energy storage device is maintained within an acceptable range to optimize the operation of the single stage converter.

In an alternative embodiment of the present invention, the inductor is coupled to a rectifier for rectifying an input voltage received from the source of electrical power. An input AC voltage is, therefore, rectified before being converted by the single stage converter. Any rectification device, including, without limitation, a bridge rectifier, is well within the broad scope of the present invention.

In an alternative embodiment of the present invention, the single stage converter includes an isolation transformer coupled between the energy storage device and the output of the converter. The isolation transformer provides galvanic primary to secondary isolation for the single stage converter.

In an alternative embodiment of the present invention, the first and second power switches are each field effect transistors ("FETs"). Switches, such as FETs, are employed in switched-mode power converters (as described herein) because of inherent characteristics of the power converters, such as zero-voltage switching, that augment the overall operation of the power conversion devices. One skilled in the pertinent art should understand that other switching devices are well within the scope of the present invention.

In an alternative embodiment of the present invention, the energy storage device includes a capacitive device. The capacitive device is charged and discharged in order to maintain the operation of the single stage converter. It is understood by those skilled in the pertinent art that other energy storage devices can be employed and are well within the scope of the present invention.

In another aspect of the present invention, the single stage converter is employed in a power supply. The power supply includes: (1) an input for receiving an input AC voltage, (2) an input low-pass filter, coupled to the input, for filtering the input AC voltage, (3) an input rectifier, coupled to the input low-pass filter, for rectifying the input AC voltage and (4) the single stage converter for supplying a well-regulated output voltage to a load coupled thereto. In addition to the power switches, the half-bridge power circuit of the single stage converter generally includes an isolation transformer to provide galvanic primary to secondary isolation for the power supply. In a preferred embodiment, the half-bridge power circuit also includes an output rectifier and low-pass filter to provide a clean rectified voltage to the load being supplied by the power supply.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

Figure 1:
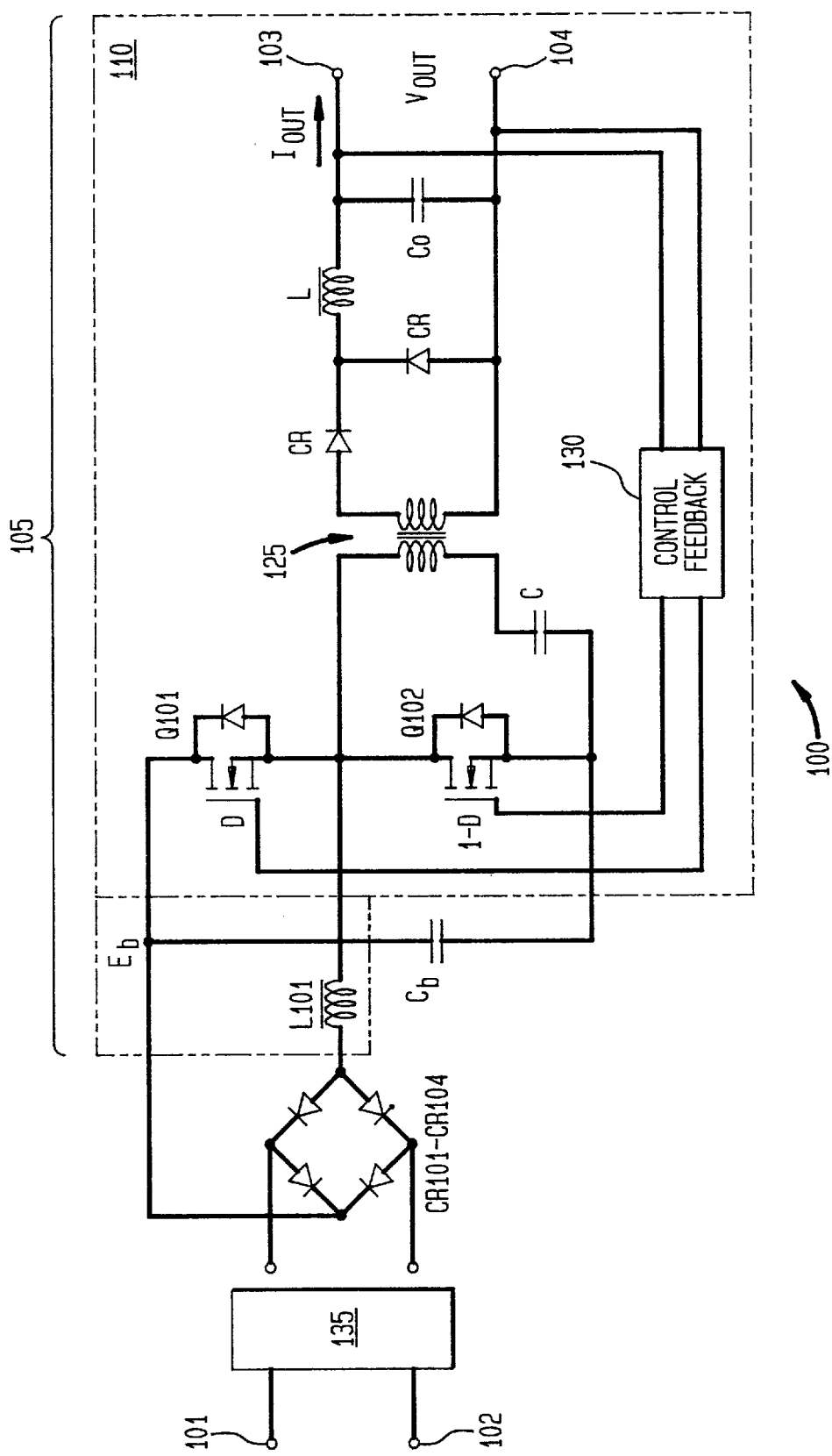
FIG. 1 illustrates a representative power supply incorporating a single stage power converter in accordance with the present invention.

Referring initially to FIG. 1, illustrated is representative power supply 100 incorporating a single stage power converter or single stage converter 105 in accordance with the present invention. The single stage converter 105 includes an asymmetrical half-bridge power circuit ("half-bridge power circuit") 110, a controller 130 (presented within the half-bridge power circuit 110 in the illustrated embodiment) and an inductor L101. The power supply 100 further includes an input low-pass filter [e.g., an electromagnetic interference ("EMI") filter] 135, an AC full-bridge rectifier circuit (comprising rectifiers CR101–CR104) or rectifier and bulk capacitor $C_b$.

The inductor L101 is coupled between the rectifiers CR101–CR104 and bulk capacitor $C_b$. The bulk capacitor $C_b$, as hereinafter described, is charged by the operation of the single stage converter 105. More specifically, during a first switching interval or first interval the inductor L101 is charged with energy. During a second switching interval or second interval, the energy in the inductor L101 is transferred to the bulk capacitor $C_b$.

The operation of the half-bridge power circuit 110 is generally known to those skilled in the art and, thus, a detailed description will not be provided. Typically, the half-bridge power circuit 110 is a voltage fed DC-to-DC power converter or DC/DC converter that is able to operate over a certain range of DC input voltages, $E_{b\ min}$ to $E_{b\ max}$. The input current of the half-bridge power circuit 110, averaged over a switching cycle, at a given load, is inversely related to the DC input bus voltage $E_b$ (e.g., for lower DC input voltages, the half-bridge power circuit 110 typically draws greater input currents). In the single stage converter 105 of the present invention, however, the instantaneous input current is proportional to the instantaneous input voltage thereby providing a high power factor. The input characteristic of the power supply 100 incorporating the single stage converter 105 emulates a resistor with respect to the AC utility line connected to input terminals 101, 102 (while also maintaining a well-regulated DC voltage at output terminals 103, 104) thereby realizing a power factor near unity.

In operation, the AC line voltage is coupled to the rectifiers CR101–CR104 through the input terminals 101, 102 and the input low-pass filter 135. The switching operation of the power switches Q101, Q102 of the single stage converter 105 simultaneously controls two power conversion processes. The first power conversion process is the conversion of AC line voltage, rectified by the rectifiers CR101–CR104, into a DC bus voltage developed across the bulk capacitor $C_b$. The second power conversion process, accomplished by the half-bridge power circuit 110, is the conversion of the DC bus voltage across bulk capacitor $C_b$ into isolated and well-regulated DC voltage at the output terminals 103, 104.

The power switches Q101, Q102 operate in a complementary manner with duty cycles of D and 1-D, respectively. In a preferred embodiment, the controller 130 is a pulse-width-modulator circuit operative (capable of producing two complimentary power trains D and 1-D) to monitor the DC voltage at the output terminals 103, 104 and adjust the duty cycle D as necessary to maintain precise regulation of the DC voltage. Pulse-width-modulator control circuits are well known to those skilled in the art.

The first power conversion process (i.e. the conversion of AC line voltage into a DC bus voltage developed across bulk capacitor 180) is accomplished, in part, during the part of the switching cycle when the power switch Q101 is driven on by the controller 130. When the power switch Q101 is on, the inductor L101 is charged with energy by a current flowing from the input terminals 101, 102, through the input low-pass filter 135, rectifiers CR101–CR104 and the power switch Q101. In a complementary part of the cycle (i.e. when the power switch Q102 is on), the stored energy in the inductor L101 is delivered into the bulk capacitor $C_b$ through the power switch Q102.

The second power conversion process occurs simultaneously with the first part of the first power conversion process (i.e., during the period when the power switch Q101 is on and the power switch Q102 is off). When the power switch Q101 is on, energy stored in the bulk capacitor $C_b$ causes a current to flow through the primary winding of a transformer 125 of the half-bridge power circuit 110. The method employed by the half-bridge power circuit 110 to convert the energy stored in the bulk capacitor $C_b$ into a DC voltage at the output terminals 103, 104 of the power supply 100 is generally known to those skilled in the art and, therefore, will not be described.

Figure 2:
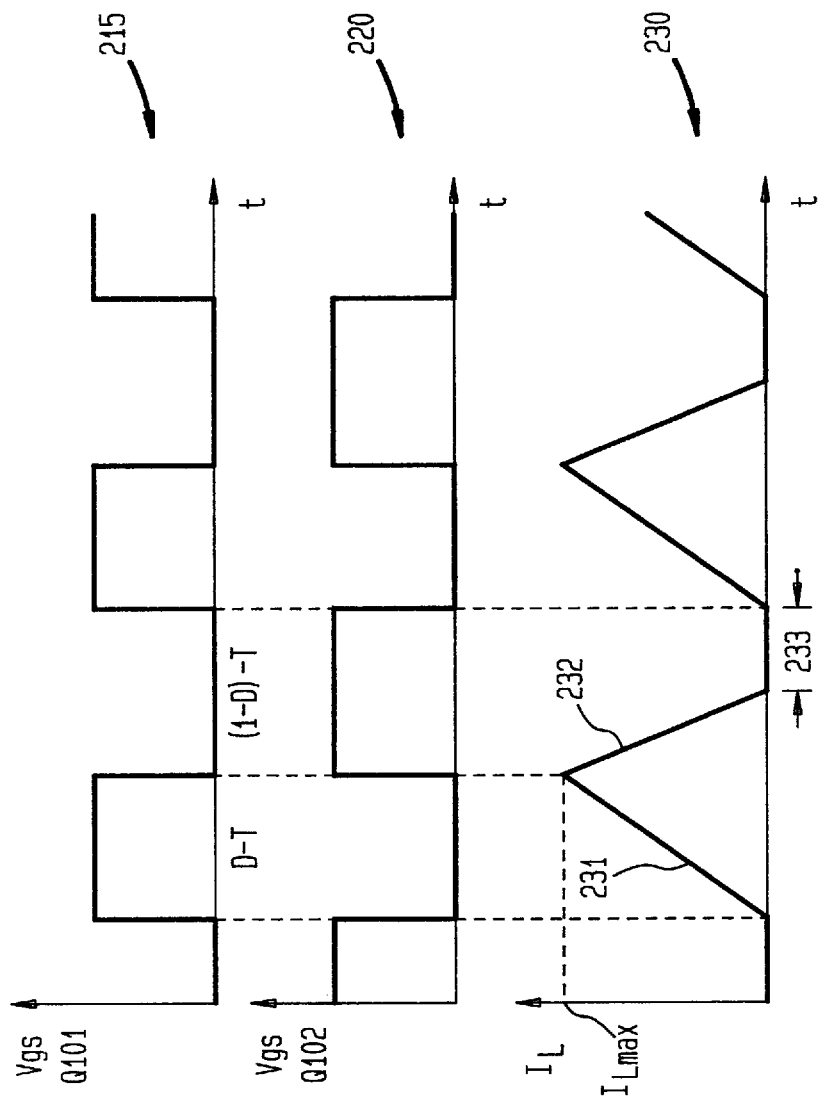
FIG. 2 illustrates timing diagrams of the power supply of FIG. 1.

Turning now to FIG. 2, illustrated are timing diagrams of the power supply 100 of FIG. 1. The following waveforms will be described with continuing reference to FIG. 1. More specifically, a pulse train 215 illustrates a control signal, generated by the controller 130, that is applied to the gates of the power switch Q101. A pulse train 220 illustrates a control signal, generated by the controller 130, that is applied to the gate of the power switch Q102. Finally, a waveform 230 illustrates a current through the inductor L101.

Those skilled in the art will recognize that the reference in the curves to the letter "T" represents a reciprocal of the switching frequency of the power supply 100; the reference to the letter "D", in the curves, represents a duty cycle of the power switches. As previously described and demonstrated by the pulse trains 215 and 220, the power switches Q101, Q102 operate in a complementary manner with duty cycles of D and 1-D, respectively. Thus, when the power switch Q101 is on, the inductor L101 is charged by a current having a waveform illustrated by a region 231 of the waveform 230. In the complementary part of the cycle (i.e. when the power switch Q101 is off and the power switch Q102 is on), the energy stored in the inductor L101 is delivered into the bulk capacitor $C_b$ as illustrated by a region 232 of the waveform 231). The process of charging the inductor L101 and thereafter discharging the inductor L101 into the bulk capacitor $C_b$ is repeated every switching cycle.

To achieve a power factor approaching unity at the input terminals 101, 102, the inductor L101 operates in a discontinuous conduction mode of operation. Therefore, those skilled in the art will recognize that the value of the inductor L101 should be chosen according to the formula:

$$L < \frac{E_b(1-D)}{F_o I_m} \quad (1)$$

where L is the value of the inductor L101, $F_o$ is the switching frequency of the power supply 100, and $I_m$ is the peak inductor current. The value of L should be selected to insure that, for a given range of input voltages and a load across the output terminals 103, 104, the current through the inductor L101 decreases to zero when the inductor L101 discharges all of its energy into the bulk capacitor $C_b$. This "discontinuous conduction mode" of the inductor L101 is illustrated by the waveform 230, where it can be seen that the current of the inductor L101 has a value of zero in a region 233. Satisfaction of the above equation ensures that the current through the inductor L101 ceases flowing before the power switch Q102 turns off.

A further preferable condition for the proper operation of the power supply 100 is that the voltage $E_b$ across the bulk capacitor $C_b$ (i.e., the voltage at the input voltage of the half-bridge power circuit 110) should be maintained between $E_{b\ min}$ and $E_{b\ max}$. As those skilled in the art will recognize, the voltage $E_b$ may be properly maintained by adhering to the following equations:

$$E_{b\ min} = \frac{V_{ac\ min}}{1 - [(D_{max}^2 \times V_{ac\ min}^2)/(2LI_{out}V_{out}F_o)]} \quad (2)$$

$$E_{b\ max} = \frac{V_{ac\ max}}{1 - [(D_{min}^2 \times V_{ac\ max}^2)/(2LI_{out}V_{out}F_o)]} \quad (3)$$

where:

$V_{ac\ min}$ and $V_{ac\ max}$ are the preferred minimum and maximum RMS voltages provided at the input terminals 101, 102, $V_{out}$ and $I_{out}$ are the preferred output voltage and current available at the output terminals 103, 104, respectively, L is the value of the inductor L101, $F_o$ is the converter switching frequency, and $D_{min}$ and $D_{max}$ are the preferred minimum and maximum duty cycles within the preferred operating range.

Those skilled in the art will readily appreciate the utility of equations (2) and (3), in selecting the parameters of the power supply 100 to achieve a desired range of operation.

Figure 3A:
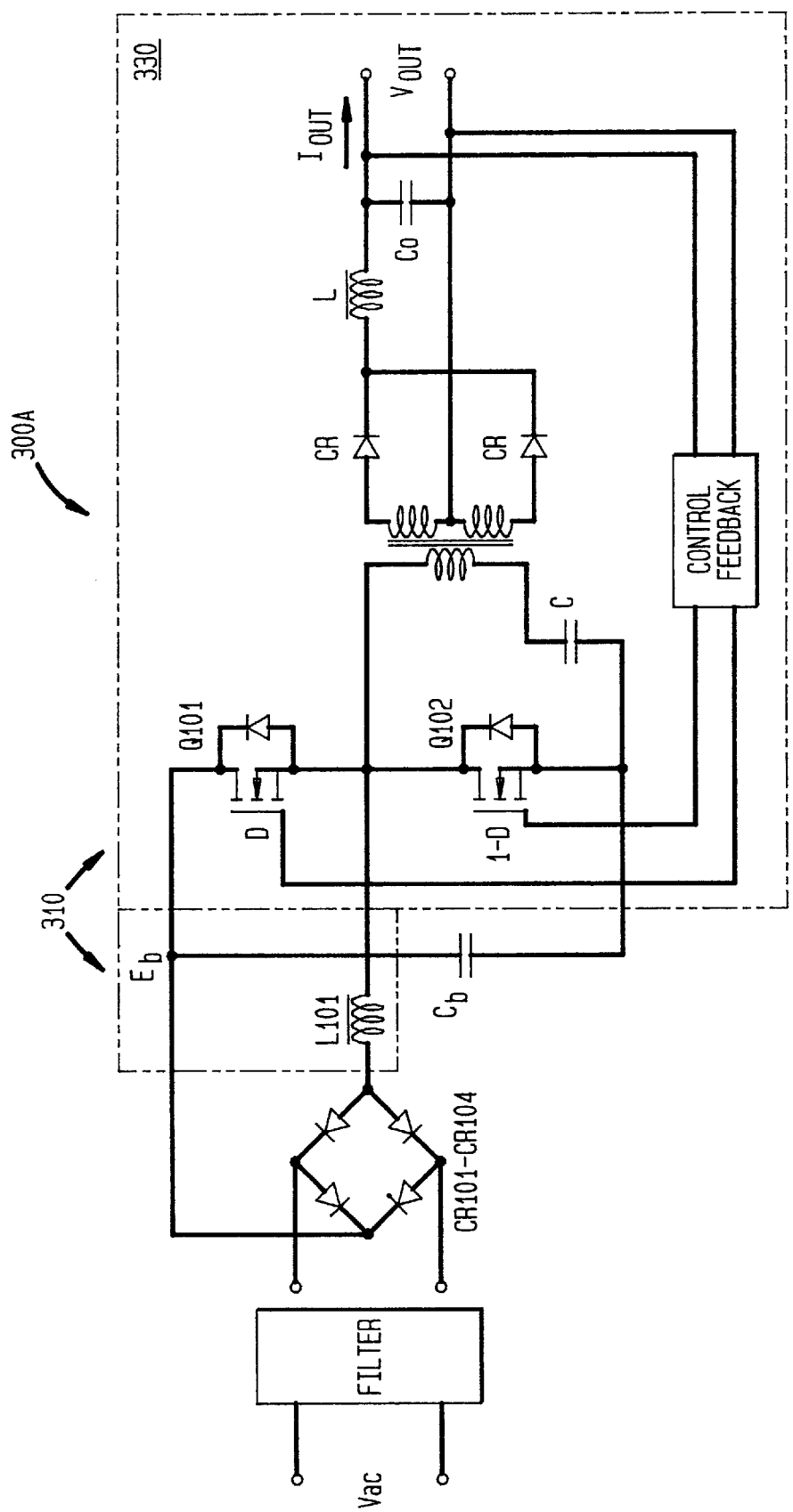
FIGS. 3A, 3B illustrate alternative embodiments of power supplies each incorporating a single stage power converter in accordance with the present invention.
Figure 3B:
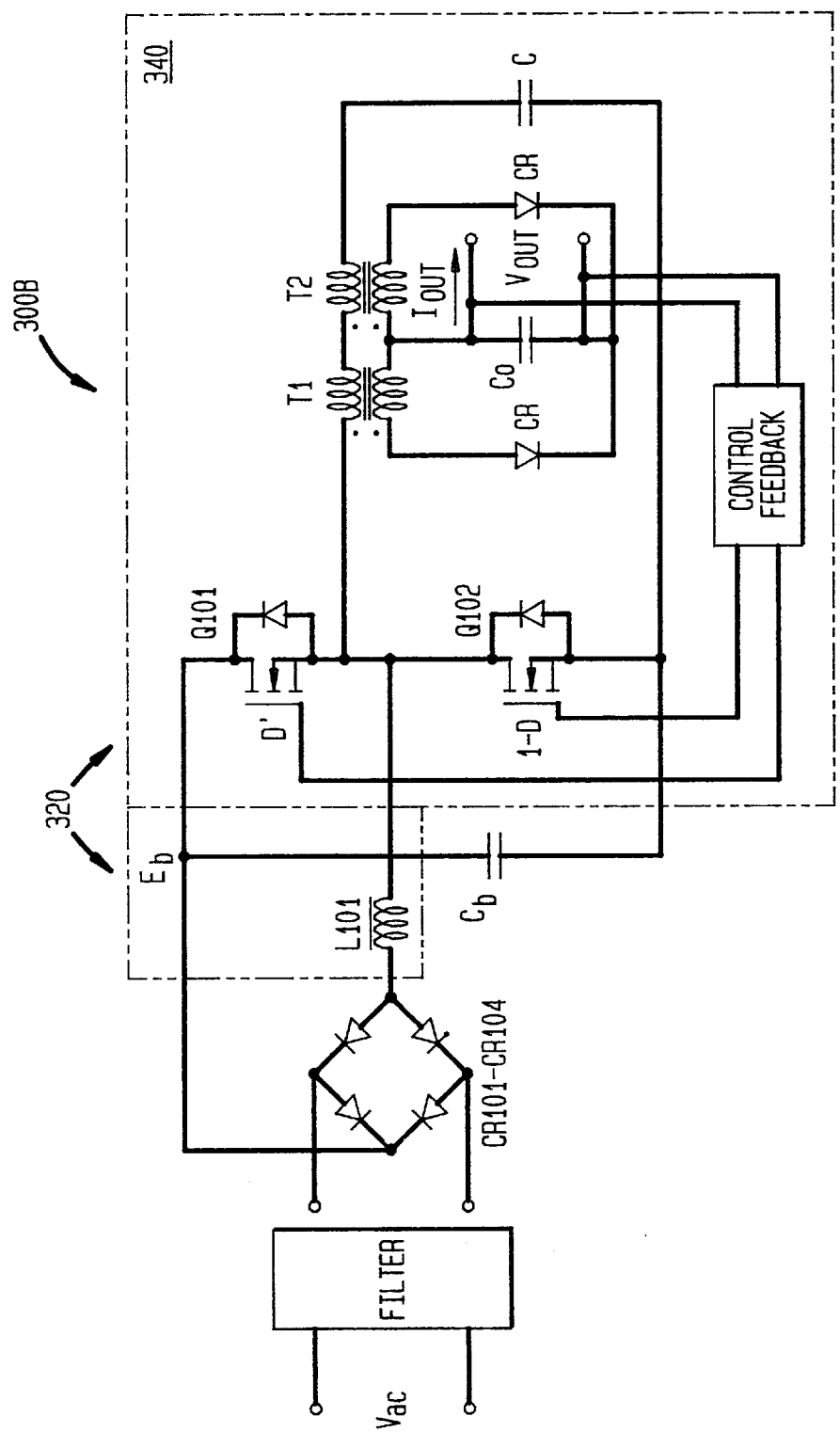

Turning now to FIGS. 3A and 3B, illustrated are alternative embodiments of power supplies 300A, 300B incorporating a single stage converter 310, 320, respectively, in accordance with the present invention. The power supplies 300A, 300B are analogous to the power supply 100 of FIG. 1, with the exception of the particular circuit topology for a half-bridge power circuit 330, 340 employed therein. Those skilled in the art should understand that the half-bridge power circuits 110, 330, 340 of FIGS. 1, 3A, 3B, respectively, operate in a similar manner and are each operative to be employed in accordance with the principles of the present invention.

For an analysis of the operation of analogous half-bridge power circuits in power converters, the readers attention is directed to: (1) U.S. Pat. No. 5,305,191 to Loftus, issued on Apr. 19, 1994, entitled "Drive Circuit for Zero-Voltage Switching Power Converter with Controlled Power Switch Turn-On," (2) U.S. Pat. No. 5,274,543 to Loftus, issued on Dec. 28, 1993, entitled "Zero-Voltage Switching Power Converter with Lossless Synchronous Rectifier Gate Drive" and (3) U.S. Pat. No. 5,268,830 to Loftus, issued on Dec. 7, 1993, entitled "Drive Circuit for Power Switches of a Zero-Voltage Switching Power Converter," all commonly assigned with the present invention and herein incorporated by reference. In conjunction therewith, the single stage converters 310, 320 operate analogously to the single stage converter 105 described with respect to FIG. 1.

Although the present invention has been described in detail, those skilled in the art should understand that they can make various changes, substitutions and alterations herein without departing from the spirit and scope of the invention in its broadest form.

What is claimed is:

1. A single stage power converter including an energy storage device and couplable to a source of electrical power, comprising:

an inductor, coupled to said energy storage device, for affecting a voltage across said energy storage device;

an asymmetrical half-bridge power circuit coupled to said energy storage device and having first and second power switches capable of being alternately activated to conduct current from said inductor to said energy storage device and from said energy storage device to an output of said power converter without requiring a switch between said energy storage device and said asymmetrical half-bridge power circuit; and a controller for controlling activation of said first and second power switches as a function of a characteristic of said output thereby to enhance a regulation of said output.

2. The converter as recited in claim 1 further comprising an input rectifier coupled to said inductor for rectifying an input voltage received from said source of electrical power.

3. The converter as recited in claim 1 wherein said inductor is capable of storing energy from said source of electrical power during a first interval, said inductor further capable of delivering energy to said energy storage device during a second interval.

4. The converter as recited in claim 3 wherein said controller activates said first power switch during said first interval for a duty cycle (D) to provide a first conductive path between said source of electrical power and said inductor, said controller further activating said second power switch during said second interval for a duty cycle (1-D) to provide a second conductive path between said inductor and said energy storage device.

5. The converter as recited in claim 1 further comprising an isolation transformer coupled between said energy storage device and said output of said converter.

6. The converter as recited in claim 1 wherein said first and second power switches are each field effect transistors (FETS).

7. The converter as recited in claim 1 wherein said energy storage device comprises a capacitive device.

8. A method of operating a single stage power converter including an energy storage device and couplable to a source of electrical power, comprising the steps of:

affecting a voltage across said energy storage device with an inductor;

alternately activating first and second power switches of an asymmetrical half-bridge power circuit, said first and second power switches conducting current from said inductor to said energy storage device and from said energy storage device to an output of said power converter without requiring a switch between said energy storage device and said asymmetrical half-bridge power circuit; and controlling activation of said first and second power switches with a controller, said control being a function of a characteristic of said output thereby to enhance a regulation of said output.

9. The method as recited in claim 8 further comprising the step of rectifying an input voltage from said source of electrical power with an input rectifier.

10. The method as recited in claim 8 wherein the step of affecting further comprises the steps of:

storing energy in an inductor received from said source of electrical power during a first interval; and delivering energy from said inductor to said energy storage device during a second interval.

11. The method as recited in claim 10 wherein the step of controlling further comprises the steps of:

activating said first power switch, with said controller, during said first interval for a duty cycle (D) to provide a first conductive path between said source of electrical power and said inductor; and activating said second power switch, with said controller, during said second interval for a duty cycle (1-D) to provide a second conductive path between said inductor and said energy storage device.

12. The method as recited in claim 8 further comprising the step of isolating said source of electrical power from said output of said converter.

13. The method as recited in claim 8 wherein said first and second power switches are each field effect transistors (FETs).

14. The method as recited in claim 8 wherein said energy storage device comprises a capacitive device.

15. A power supply, comprising:

an input for receiving an input AC voltage;

an input low-pass filter, coupled to said input, for filtering said input AC voltage;

an input rectifier, coupled to said input low-pass filter, for rectifying said input AC voltage; and a single stage power converter including an energy storage device, comprising:

an inductor, coupled to said energy storage device, for affecting a voltage across said energy storage device, an asymmetrical half-bridge power circuit coupled to said energy storage device and having first and second power switches capable of being alternately activated to conduct current from said inductor to said energy storage device and from said energy storage device to an output of said power converter without requiring a switch between said energy storage device and said asymmetrical half-bridge power circuit; and a controller for controlling activation of said first and second power switches as a function of a characteristic of said output thereby to enhance a regulation of said output.

16. The power supply as recited in claim 15 wherein said input rectifier comprises at least one diode.

17. The power supply as recited in claim 15 wherein said inductor is capable of storing energy from said rectified input AC voltage during a first interval, said inductor further capable of delivering energy to said energy storage device during a second interval.

18. The power supply as recited in claim 17 wherein said controller activates said first power switch during said first interval for a duty cycle (D) to provide a first conductive path between said input and said inductor, said controller further activating said second power switch during said second interval for a duty cycle (1-D) to provide a second conductive path between said inductor and said energy storage device.

19. The power supply as recited in claim 15 wherein said asymmetrical half-bridge power circuit comprises an isolation transformer.

20. The power supply as recited in claim 15 wherein said asymmetrical half-bridge power circuit comprises an output rectifier.

21. The power supply as recited in claim 15 wherein said asymmetrical half-bridge power circuit comprises an output low-pass filter.

* * * * *